Patented Nov. 7, 1939

2,179,004

UNITED STATES PATENT OFFICE 2,179,004

CLEANING COMPOSITION

Frederic L. Bishop, Jr., Jeannette, Pa., assignor to American Window Glass Company, Pittsburgh, Pa., a corporation of Pennsylvania No Drawing. Application September 28, 1936, Serial No. 102,980

6 Claims. (Cl. 87—5)

The present invention relates to the cleaning or treating of glass sheets, and more particularly to the cleaning or treating of glass sheets which are to be utilized in the manufacture of laminated glass.

Heretofore a substantial quantity of the commercial laminated glass has been manufactured by interposing a preformed sheet of strengthening material between the sheets of glass and securely uniting it to the glass sheets by various adhesives. Cellulose nitrate and cellulose acetate have been used primarily as the strengthening material, and gelatine has been used primarily as the adhesive material. Various other expedients have been tried, such as softening the preformed sheet by means of plasticizing agents, but these methods have not been particularly successful commercially. In this method of manufacturing laminated glass (referred to hereinafter as the "preformed sheet method") it is of considerable importance that the glass sheets to be united with the strengthening material to form the sandwich be thoroughly cleansed prior to being coated with the adhesive or united to the strengthening material. If proper cleaning or treatment is not carried out, a considerable amount of difficulty will be encountered during and after the compositing operation. The sheets forming the sandwich do not properly adhere together and let-goes form during the compositing operation or subsequently thereto and the product must be rejected as unsatisfactory, and if the let-goes develop after shipment the product is returned as defective.

This cleaning or treating problem has been a particularly vexatious one and has not been heretofore solved, even in the preformed sheet method where adhesives are used. The high percentage of rejects in the manufacture of laminated glass has been due to the fact that proper cleaning or treatment of the glass sheets prior to lamination has not been heretofore accomplished.

In the liquid process of manufacturing laminated glass, which is of recent development, the problem of properly cleaning or treating the glass sheets has become even more acute. In this process, the strengthening material is flowed on the glass sheets in liquid form, the solvent or at least a portion thereof driven off by heat, and thereafter two coated glass sheets or one coated and one uncoated glass sheet united together in an appropriate manner to form the sandwich. In this process no adhesive material is employed to effect the adhesion between the layer of strengthening material and the glass sheets, the layer of strengthening material adhering directly to the glass sheets. As will be readily appreciated by those skilled in this art, it is therefore highly important that the glass sheets be properly and thoroughly cleaned or treated prior to the coating or filming operation, or otherwise the adhesion between the component parts of the sandwich will not be uniform and let-goes will develop during or subsequent to the compositing operation. Many such let-goes will develop subsequent to the compositing operation if proper cleansing or treating and hence proper adhesion, is not accomplished, due to the fact that the irregular adhesion will cause strain to be induced into the product which may cause let-goes under slight impact or normal usage.

Heretofore, the cleaning of the glass sheets both in the preformed sheet method of manufacture and in the liquid process of manufacture, was effected by various types of cleaning machines adapted to brush or scrub the glass sheets. As is well known in this art, such machines embody apparatus for supplying water to the glass sheets for effecting the cleaning operation in conjunction with the brushing or scrubbing apparatus. This method of effecting the cleaning or pretreatment of the glass sheets has been found very unsatisfactory and particularly where the liquid process of manufacture is employed.

The chemical cleaning of the glass sheet has also heretofore been attempted but without success.

By my invention I provide a cleaning or treating fluid, a method of manufacturing the same and a method of cleaning or treating the glass sheets which completely overcome the difficulties heretofore encountered. By my invention the cleaning or treating of the glass sheets can be accomplished so as to cause the strengthening material and the glass sheets to adhere substantially throughout the entire area thereof.

In accordance with my invention, I propose to mix a metallic chloride with an organic solvent which acts as a solvent on the metallic chloride. By solvent I do not mean merely a liquid which by physical action dissolves the metallic chloride, but also a liquid which by chemical action acts as a solvent. The resulting product is an excellent glass cleaning or treating compound. I have found that an excellent compound is obtained where a metallic chloride is mixed with dichloroethyl ether. Other examples of organic solvents which may be used are methyl ethyl ketone, ethylene dichloride, tetra-chlor-ethane and chlor-ethoxy-chlor-ethyl ether.

The cleaning fluid which I provide by my invention may be prepared in accordance with any of the following examples:

*Example I.*—Ferric chloride, preferably anhydrous ferric chloride, is mixed with dichloroethyl ether. Preferably the beta-beta-prime isomer of dichloroethyl ether is employed. Preferably the quantity of the anhydrous ferric chloride employed in the mixture is approximately 1 to 2% by weight of the dichloroethyl ether. However, I have found that various proportions of the anhydrous ferric chloride and dichloroethyl ether may be employed, but that best results are obtained where the quantity of anhydrous ferric chloride is between ¼% and 15%, by weight, of the dichloroethyl ether.

Example II.—Manganese chloride may be substituted for the anhydrous ferric chloride in Example I, and mixed with the dichloroethyl ether in the proportions set forth in Example I.

Example III.—Zinc chloride may be substituted for the anhydrous ferric chloride of Example I, and mixed with the dichloroethyl ether in the proportions set forth.

Example IV.—Calcium chloride may be substituted for the anhydrous ferric chloride of Example I, and mixed with the dichloroethyl ether in the proportions set forth.

Example V.—Sodium chloride may be substituted for the anhydrous ferric chloride of Example I, and mixed with the dichloroethyl ether in the proportions indicated.

Example VI.—In any of the foregoing examples acetone may be substituted for a portion of the dichloroethyl ether or acetone added to the product resulting from following such examples. For example, the anhydrous ferric chloride may be mixed with a 50% mixture of dichloroethyl ether and acetone. Where a mixture of 50% dichloroethyl ether and 50% acetone is employed and the anhydrous ferric chloride added thereto, I prefer to employ approximately 1 to 2% anhydrous ferric chloride, but it will be understood that the quantity of anhydrous ferric chloride may be varied within the proportions set forth above under Example I.

Example VII.—In any of the foregoing examples, a small amount of any well known emulsifying agent may be employed. I have found that by adding a small percentage of an emulsifying agent, such as sulphonated castor oil, the cleaning or treating of the glass sheets is materially aided, particularly where the glass sheets are slightly damp. I have found that the addition of approximately ½% of the emulsifying agent is sufficient.

In manufacturing the cleaning or treating fluids which I provide by my invention, it is merely necessary to mix the ingredients carefully. I have found that it is unnecessary to permit the fluid to age after the mixing in order to obtain a satisfactory cleaning or treating action when used on the glass sheets.

When cleaning or treating glass sheets with the fluid which I provide by my invention, it is flowed, sprayed or otherwise placed on the glass sheets and allowed to remain thereon for a relatively short period of time, for example, from 5 to 20 seconds. Thereafter, the cleaning or treating fluid may be removed from the glass sheets aided, particularly where the glass sheets are by flushing them with water or by passing them through the ordinary glass cleaning machine of any of the types which are well known in the glass cleaning art. It is not absolutely essential that the fluid which I provide be removed from the glass sheets after being permitted to remain thereon for a relatively short period of time. However, I have found that it should be substantially removed within a relatively short period of time after being deposited thereon due to the fact that it has a tendency to adhere very closely to the glass sheets and is very difficult to remove at a later time.

While I have referred to the fluid which I provide by my invention as a cleaning fluid, I do not necessarily mean that it functions to remove grease, dirt, and the like which may be on the surface of the glass sheets. I believe that it accomplishes this purpose, but in addition thereto either reacts chemically with the glass sheets, or removes a thin scum or skin which may be on the surface of the glass sheets and which is not removed by ordinary cleaning fluids, or it may form a thin film which remains on the glass sheets and materially aids in the adhesion between the glass sheets and the layer of strengthening material. If the cleaning fluid which I provide does actually form a thin film on the glass sheets, it is of such character as not to be removable by the ordinary cleaning operations, for in the practice of my invention heretofore I have actually cleaned glass sheets by ordinary cleaning processes after subjecting the glass sheets to the action of my cleaning fluid, and very satisfactory adhesion between the glass sheets and the strengthening material obtained. This would clearly indicate that if a film is formed on the glass sheets when they are subjected to the action of the cleaning fluid, it is of such character as to be non-removable. If such a film is formed, it is imperceptible either to the eye or under microscopic examination.

While I have described several chlorides which may be mixed with dichloroethyl ether in order to form a satisfactory cleaning agent and have set forth a number of different examples embodying the use of additional agents, I do not intend to be limited to the proportions of the various agents which are set forth in the above examples. Various modifications of the proportions and ingredients may be made within the scope of my invention as defined in the appended claims.

I claim:

1. As a cleaning fluid for cleaning glass sheets to be used in the manufacture of laminated glass, the product resulting from mixing a chloride of a metal of the group consisting of iron, manganese, zinc, calcium and sodium, and dichloroethyl ether, the ether comprising the major proportion by weight of the ingredients.

2. As a cleaning fluid for cleaning glass sheets to be used in the manufacture of laminated glass, the product resulting from mixing ferric chloride and dichloroethyl ether, the ether comprising the major proportion by weight of the ingredients.

3. As a cleaning fluid for cleaning glass sheets to be used in the manufacture of laminated glass, the product resulting from mixing manganese chloride and dichloroethyl ether, the ether comprising the major proportion by weight of the ingredients.

4. As a cleaning fluid for cleaning glass sheets to be used in the manufacture of laminated glass, the product resulting from mixing zinc chloride and dichloroethyl ether, the ether comprising the major proportion by weight of the ingredients.

5. As a cleaning fluid for cleaning glass sheets to be used in the manufacture of laminated glass, the reaction product resulting from mixing a chloride of a metal of the group consisting of iron, manganese, zinc, calcium and sodium and dichloroethyl ether, the chloride comprising approximately ¼% to 15% by weight of the ingredients.

6. As a cleaning fluid for glass sheets to be used in the manufacture of laminated glass, the product resulting from mixing ¼% to 15% ferric chloride and dichloroethyl ether.

FREDERIC L. BISHOP, Jr.

CERTIFICATE OF CORRECTION.

Patent No. 2,179,004.  November 7, 1939.

FREDERIC L. BISHOP, JR.

It is hereby certified that error appears in the printed specification of the above numbered patent requiring correction as follows: Page 2, first column, line 61, strike out the words "aided, particularly where the glass sheets are"; and that the said Letters Patent should be read with this correction therein that the same may conform to the record of the case in the Patent Office.

Signed and sealed this 12th day of December, A. D. 1939.

(Seal)

Henry Van Arsdale,
Acting Commissioner of Patents.